United States Patent
Tulaczko

(10) Patent No.: US 7,350,354 B2
(45) Date of Patent: Apr. 1, 2008

(54) HYDRAULIC ACTUATION APPARATUS FOR A MOTOR VEHICLE CLUTCH

(75) Inventor: Boleslaw Tulaczko, Schonungen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/140,025

(22) Filed: May 26, 2005

(65) Prior Publication Data

US 2005/0262840 A1 Dec. 1, 2005

(30) Foreign Application Priority Data

| May 27, 2004 | (EP) | .................. 04012525 |
| May 27, 2004 | (EP) | .................. 04012526 |
| Aug. 19, 2004 | (DE) | ............ 10 2004 040 209 |

(51) Int. Cl.
*F15B 7/10* (2006.01)
*F16L 55/04* (2006.01)

(52) U.S. Cl. ..................... 60/469; 192/109 F
(58) Field of Classification Search .................. 60/592, 60/469; 192/109 F
See application file for complete search history.

(56) References Cited

U.S. PATENT DOCUMENTS

| 5,320,203 A | * | 6/1994 | Wilber et al. ................. 60/469 |
| 5,960,922 A | | 10/1999 | Riess et al. |
| 6,148,614 A | * | 11/2000 | Nix et al. ..................... 60/592 |
| 6,250,201 B1 | | 6/2001 | Pagels et al. |
| 6,430,928 B1 | | 8/2002 | Iyer et al. |
| 6,742,643 B2 | * | 6/2004 | Nix et al. ................. 192/109 F |
| 6,745,886 B1 | | 6/2004 | Rey et al. |
| 6,789,388 B1 | * | 9/2004 | Leigh-Monstevens et al. ........................... 60/592 |

FOREIGN PATENT DOCUMENTS

| DE | 195 00 908 | 1/1996 |
| DE | 196 50 734 | 6/1998 |
| DE | 100 08 479 | 8/2000 |
| DE | 199 54 919 | 5/2001 |
| JP | 58000424 | 1/1983 |
| JP | 62200034 | 9/1987 |
| WO | WO98/48212 A | 10/1998 |

* cited by examiner

*Primary Examiner*—Thomas E. Lazo
(74) *Attorney, Agent, or Firm*—Cohen Pontani Lieberman & Pavane LLP

(57) ABSTRACT

A hydraulic actuation apparatus for a motor vehicle clutch includes a master cylinder, a slave cylinder, a hydraulic line forming a main fluid channel connecting the master cylinder to the slave cylinder to form a pressure space, and a damping member arranged in the pressure space for attenuating pressure pulses. The damping member includes a connection channel connected to the main fluid channel and a fluid guide directing fluid from the main fluid channel into the connection channel. The damping member or other hydraulic operating component is preferably formed integrally with the hydraulic line, and is preferably injection molded plastic.

23 Claims, 8 Drawing Sheets

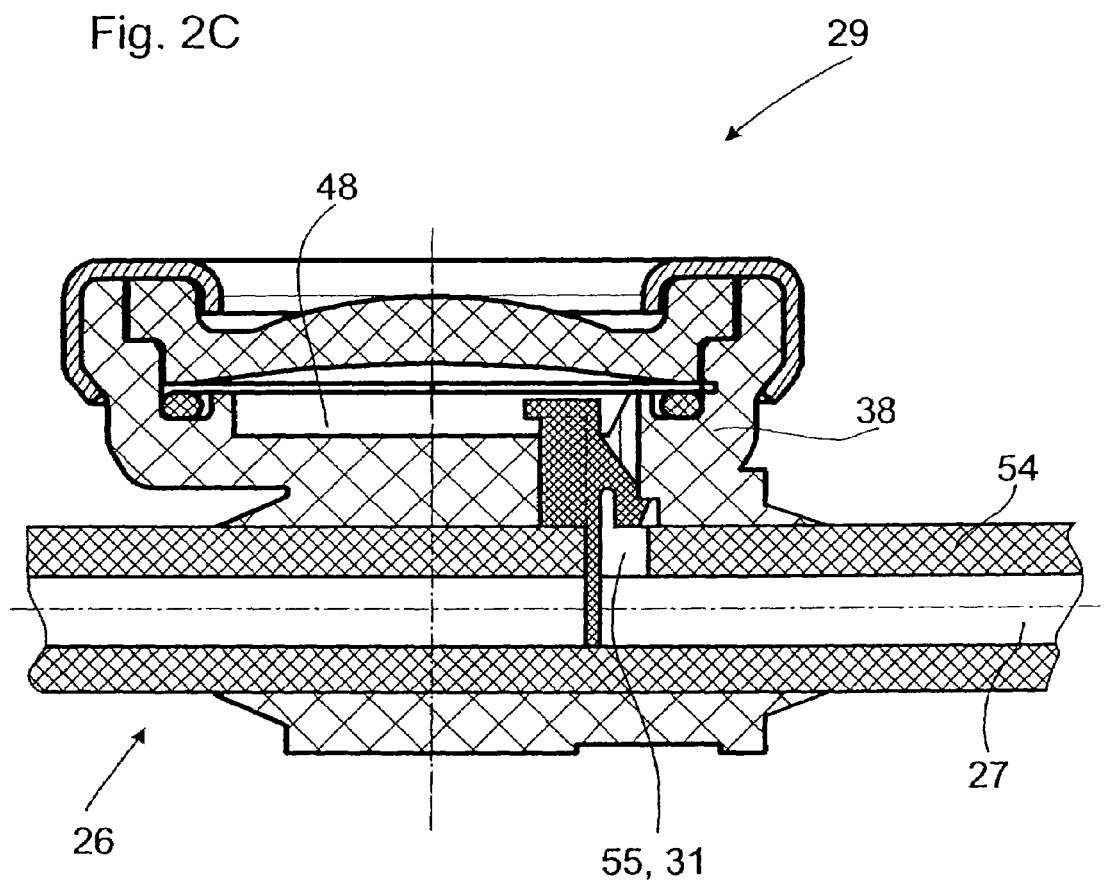

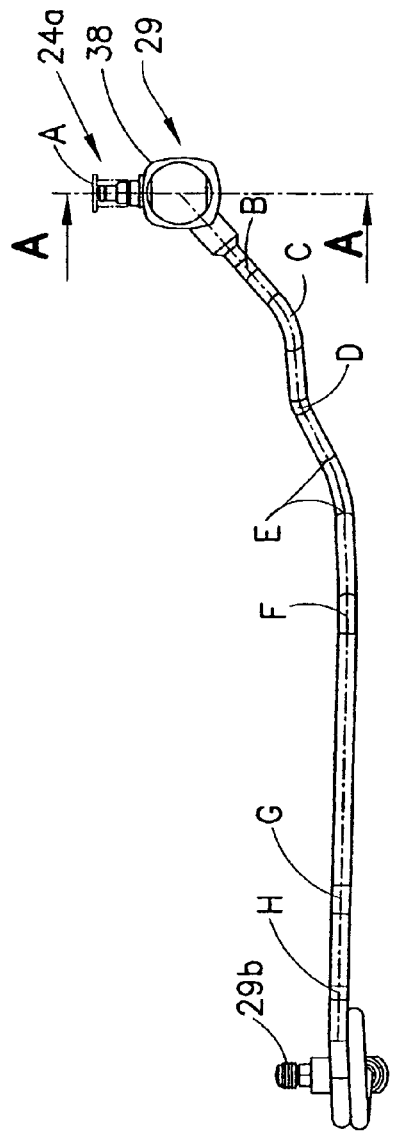
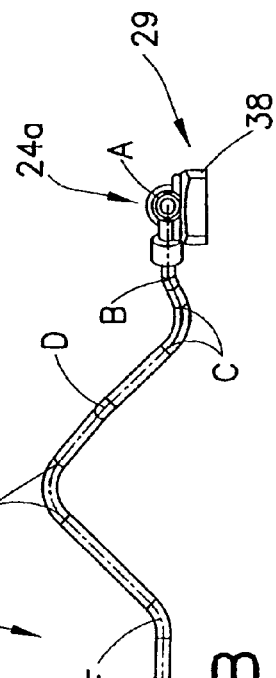
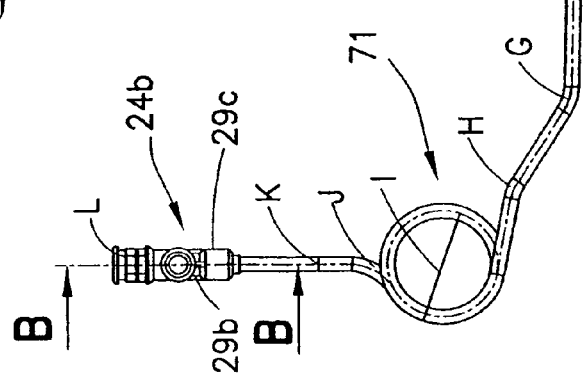
FIG.6A
FIG.6B

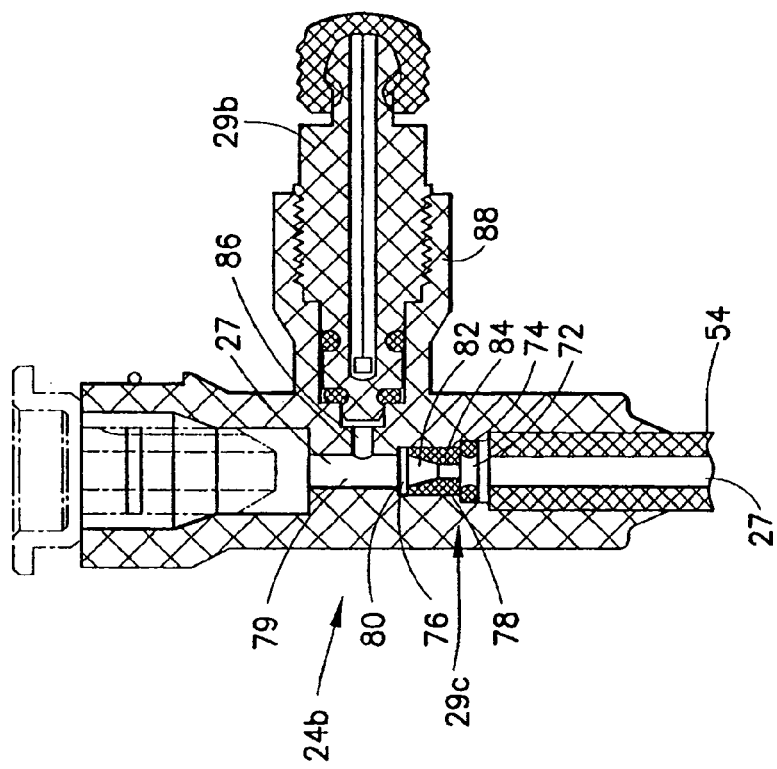
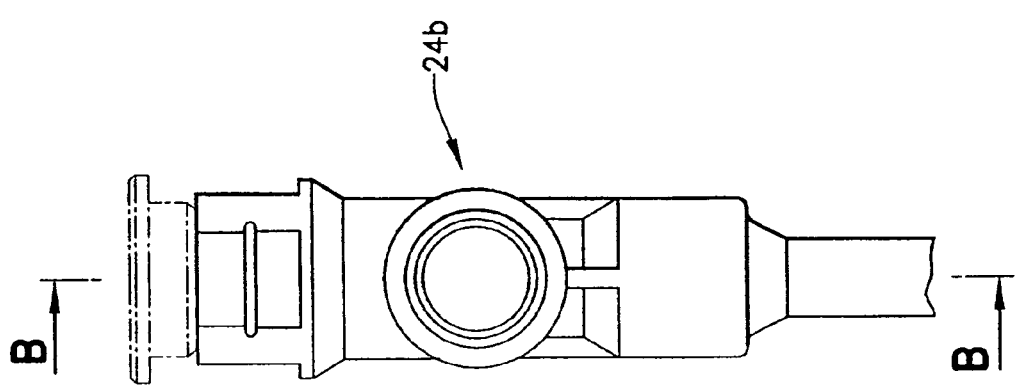
FIG.7B
FIG.7A

HYDRAULIC ACTUATION APPARATUS FOR A MOTOR VEHICLE CLUTCH

BACKGROUND OF THE INVENTION

1. Field of the Invention

The invention relates to a hydraulic actuation apparatus for a motor vehicle clutch, wherein the apparatus includes a master cylinder, a slave cylinder, a hydraulic line connecting the master cylinder to the slave cylinder to form a pressure space, and a damping member for attenuating pressure pulses in the pressure space.

2. Description of the Related Art

Hydraulic clutch actuation systems in motor vehicles have the undesirable characteristic that axial vibrations triggered by the periodically firing internal combustion engine are transmitted by the friction clutch and its diaphragm spring to the clutch release bearing and the clutch release devices connected to the latter. These axial vibrations continue into a hydraulic pressure space defined by a master cylinder and a slave cylinder and to the hydraulic channel connecting the latter and can trigger an unpleasant tingling in the foot of the driver of the vehicle when contacting the clutch pedal.

The pressure pulsations can be damped, on the one hand, by using a pressure line of limited flexibility, e.g., formed of a steel-rubber composite. In applications where this step is insufficient by itself, additional hydraulic damping members constructed as so-called tickle filters can be integrated in the hydraulic actuation system in addition. Further, steel-rubber lines are increasingly being replaced by pressure lines made entirely of plastic which are simpler to manufacture and less expensive. When loaded by pressure due to clutch actuation, these pressure lines have less elasticity than the type of line mentioned above and therefore hold less volume. In these cases, the use of a hydraulic damping member is particularly desirable.

A damping member can be placed in various positions in the pressure space of a hydraulic actuation device. For example, DE 100 08 479, which corresponds to GB 2,386,934, discloses a plurality of different kinds of damping members which are either constructed, e.g., according to the schematic view in FIG. 16, as a structural composite with the master cylinder or slave cylinder or are arranged separately within the hydraulic line. In this variant, the damping member shown in this reference has an inlet opening and an outlet opening with fluid coupling elements which are provided for connecting to two portions of a hydraulic line which also has corresponding coupling elements. Therefore, a hydraulic actuation device according to the described construction has a total of four coupling areas with eight coupling elements.

Generally, fluid clutches present critical areas in a hydraulic high-pressure system because they are a source of system failures particularly as operating time progresses. The fluid located in the hydraulic actuation device can exit from the latter and severely jeopardize the operating reliability of the vehicle. The arrangement of a damping member in combination with two hydraulic pressure lines shown in DE 100 08 479 is extremely disadvantageous in this respect and also results in high manufacturing and assembly costs.

U.S. Pat. No. 6,430,928 also describes, in FIG. 11, a damping member connected to two hydraulic lines. However, the damping member itself, in contrast to that shown in DE 100 08 479, has only a single connection area for connecting to the hydraulic lines which is formed by a T-piece, the ends of the fluid lines connected to the master cylinder and slave cylinder being inserted and permanently connected in the oppositely located connection openings of this T-piece. The remaining, third connection area of the T-piece is screwed to a connection area of the damping member by means of a thread. In this way, the quantity of detachable fluid connections is reduced by two, that is, to six, so that operating reliability is increased. On the other hand, the screw-in thread is also a source of leakiness in the hydraulic system. The provision and mounting of a separate T-connection element also represent significant cost factors.

U.S. Pat. No. 6,742,643 discloses another damping member for a hydraulic clutch actuation device. The housing of the damping member has a hydraulic line with a main channel extending between two plug-in couplers and a fluid connection for a pressure chamber of a damping member constructed as a diaphragm vibration damper, which fluid connection branches off laterally from a central area of the hydraulic line and opens into a pressure chamber of the damping member, which is constructed as a diaphragm vibration damper. The damping member itself is already very compact; but in order to produce a fluid connection to a master cylinder and slave cylinder at least one hydraulic line must also be interposed therebetween.

In an actuation system constructed in the manner described above and a damping member connected to a branch channel, it has been shown that in spite of an improvement over a system without damping, a significant proportion of pressure pulsations is still transmitted to the master cylinder and perceived by the driver as annoying.

Hydraulic coupling elements in the form of plug-in connectors or bushings at the ends of a hydraulic line serve to connect the master cylinder and slave cylinder directly or at least indirectly with the intermediary of additional hydraulic operating components.

The hydraulic actuation devices in question usually comprise an air-bleed element for removing air from the hydraulic actuation device, such as is described in DE 195 16 389, U.S. Pat. No. 5,960,922, DE 197 18 332 and DE 199 54 919, which is arranged at the housing of a slave cylinder or master cylinder. Further, it is known from practice to construct an air-bleed element as a separate T-piece that is arranged so as to be connectable between the hydraulic line and a hydraulic actuating member constructed as a concentric slave cylinder.

Further, the hydraulic actuation device can also comprise a throttle member for limiting the rate of flow of a hydraulic fluid which is arranged at the housing of a master cylinder or slave cylinder in the connection area for the hydraulic line, e.g., according to U.S. Pat. No. 6,250,201.

Further, a separate damping member can be provided in the actuation device for attenuating pressure pulsations. The pressure pulsations are caused principally by axial vibrations which are triggered by a periodically firing internal combustion engine in a vehicle and are transmitted by the friction clutch and its diaphragm spring to the clutch release bearing and the clutch release devices connected therewith. These axial vibrations continue into a hydraulic pressure space defined by a master cylinder and a slave cylinder and to the hydraulic channel connecting the latter and can trigger an unpleasant tingling in the foot of the driver of the vehicle when contacting the clutch pedal.

SUMMARY OF THE INVENTION

Based on the prior art cited above, it is the object of the present invention to further reduce the amount of structural component parts of a hydraulic actuation device for a motor vehicle clutch and, in so doing, to increase its operating reliability. It is a further object to improve the action of a damping member that is connected to a main fluid channel by a branch channel.

According to the invention, the damping member is connected to the main fluid channel by a connection channel having a fluid guide which directs fluid to a pressure chamber.

The inventor has recognized that pressure pulsations propagating in direction of the master cylinder from the slave cylinder communicating with the drivetrain of the vehicle are divided in the connection area of the damping member into a first pulsation which becomes weaker inside the damping member and a second pulsation which excites an oscillation of the piston in the master cylinder. Proceeding from this understanding, fluid is diverted in the area where the connection channel is connected to the main channel in order to generate a fluid flow that is directed substantially to the damping member so that a direct flow connection between the master cylinder and slave cylinder is eliminated to a great extent. In this way, a pressure pulsation propagating in the system is initially deflected almost completely into the damping member and can be attenuated therein. Accordingly, this functionality corresponds to that of a damping member arranged in series with an inlet fluid connection and an outlet fluid connection to the main channel.

The quantity of coupling areas in the hydraulic actuation device can be reduced even further by constructing the damping member integral with the hydraulic line so that only two coupling areas for connecting a master cylinder and slave cylinder need to be provided at the damping line element provided by the invention.

It is particularly advantageous when the damping member, the hydraulic line and the hydraulic coupling elements are made from plastic. In this case, the housing of the damping member can be injection-molded on a pre-manufactured hydraulic line in a reliable manner in terms of process technique.

Where an additional operating component, for example, an air-bleed element, provided in the hydraulic actuation device is formed integrally with the hydraulic line, this component can be exchanged more easily in the event of an operating malfunction or failure. The hydraulic line is usually connected to a master cylinder and a slave cylinder by plug-in couplings so as to enable a simple manual assembly in the normally extremely cramped installation space in a time-saving manner without the use of special tools.

When a plurality of operating components are formed integrally with the hydraulic line, there is the additional advantage that all of these operating components can be installed in the hydraulic system simultaneously in one step or can be removed or exchanged, e.g., for inspection purposes, so that the time required for inspection or repair can be reduced.

When a damping member, for example, is formed integral with the hydraulic line, the quantity of coupling areas in the hydraulic actuation device can be even further reduced so that only two coupling areas for connecting a master cylinder and slave cylinder need to be provided at the damping line element.

Where the damping member is arranged at an end area of the hydraulic line, a hydraulic coupling element, i.e., a connector or a receiving area, can be constructed simultaneously with the damping member.

However, it is also possible in principle to start with a separate damping member and a separate hydraulic line and to produce only the connecting area by means of an injection molding process or vulcanizing process, for example.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 2C is a cross-section of a second embodiment of damping member;

FIG. 6A is a side view of a hydraulic line with a damping member, an air-bleed element, and a throttle member which are constructed in each instance with fluid coupling elements;

FIG. 6B is a plan view of the hydraulic line of FIG. 6A;

FIG. 7A is an enlarged plan view of the fluid coupling element shown in FIG. 6B with a throttle member and an air-bleed element; and FIG. 7B is a cross-section along line B—B of FIG. 7A.

DETAILED DESCRIPTION OF THE PRESENTLY PREFERRED EMBODIMENTS

Figure 1:
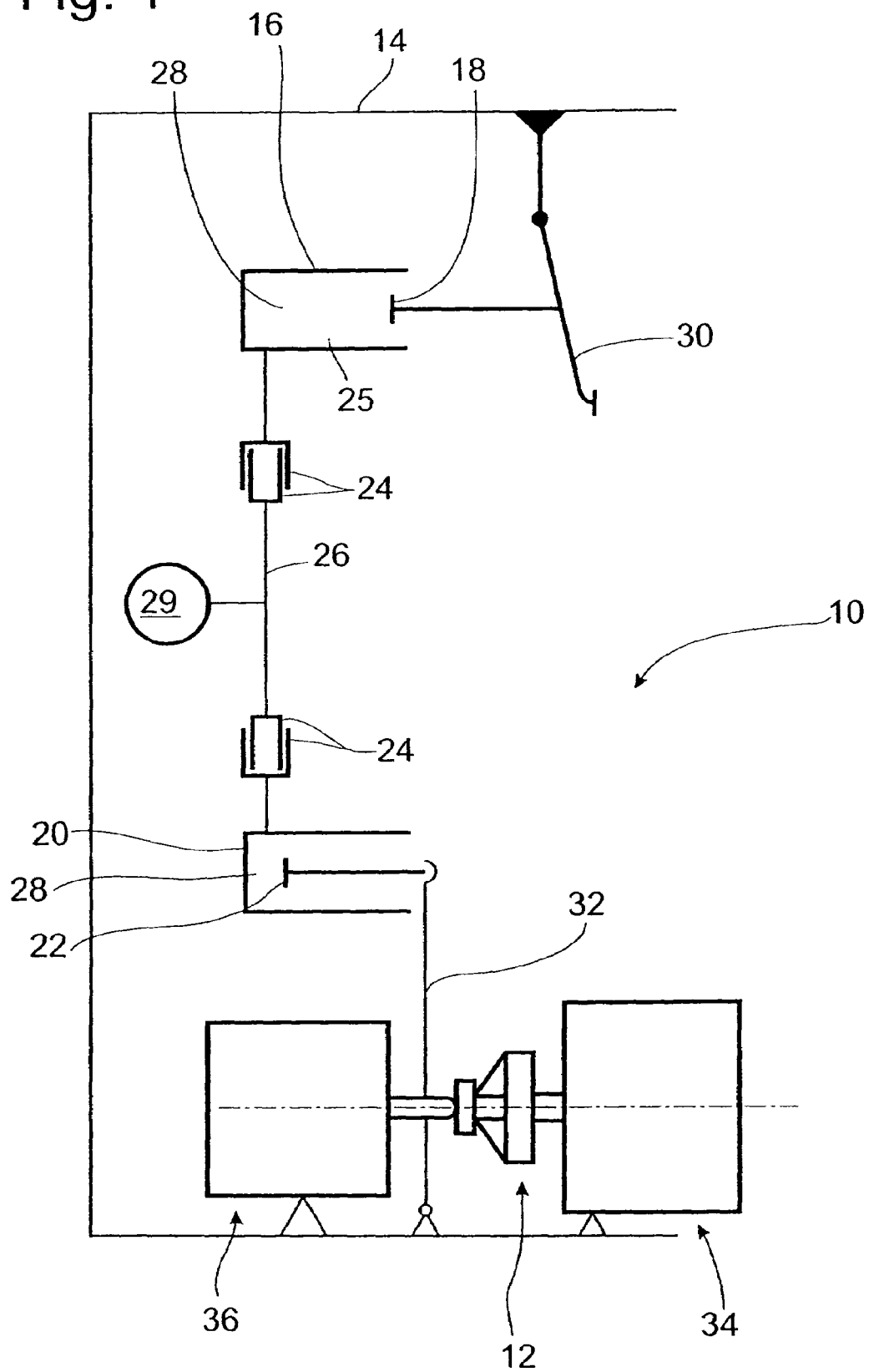
FIG. 1 is a schematic view of a hydraulic actuation device for a motor vehicle clutch with a damping member arranged therein.

A hydraulic actuation device 10 for actuating a motor vehicle clutch 12 is shown schematically in FIG. 1. The hydraulic actuation device 10 is arranged at a chassis 14 of a motor vehicle. A master cylinder 16 with a piston 18 and a slave cylinder 20 with a piston 22 are connected with one another by plug-in couplings or hydraulic coupling elements 24 to a hydraulic line 26 filled with a fluid 25 and form a common pressure space 28. The piston 18 of the master cylinder 16 can be actuated by a pedal 30, whereupon the piston 22 of the slave cylinder 20 is displaced and controls a clutch fork 32 for releasing the clutch 12 in a driving unit constructed as a combustion engine 34. The clutch 12 is connected on the input side to the driven shaft of the combustion engine 34 and on the output side to a shift transmission 36. A damping member 29 is provided inside the hydraulic line 26 for damping pressure pulsations and is connected by a connection channel 31 that branches off from a main fluid channel 27. The damping member 29 can be constructed in one piece with, i.e., integral with, the hydraulic line or, alternatively, can be connected to it by hydraulic coupling elements 24.

Figure 2A:
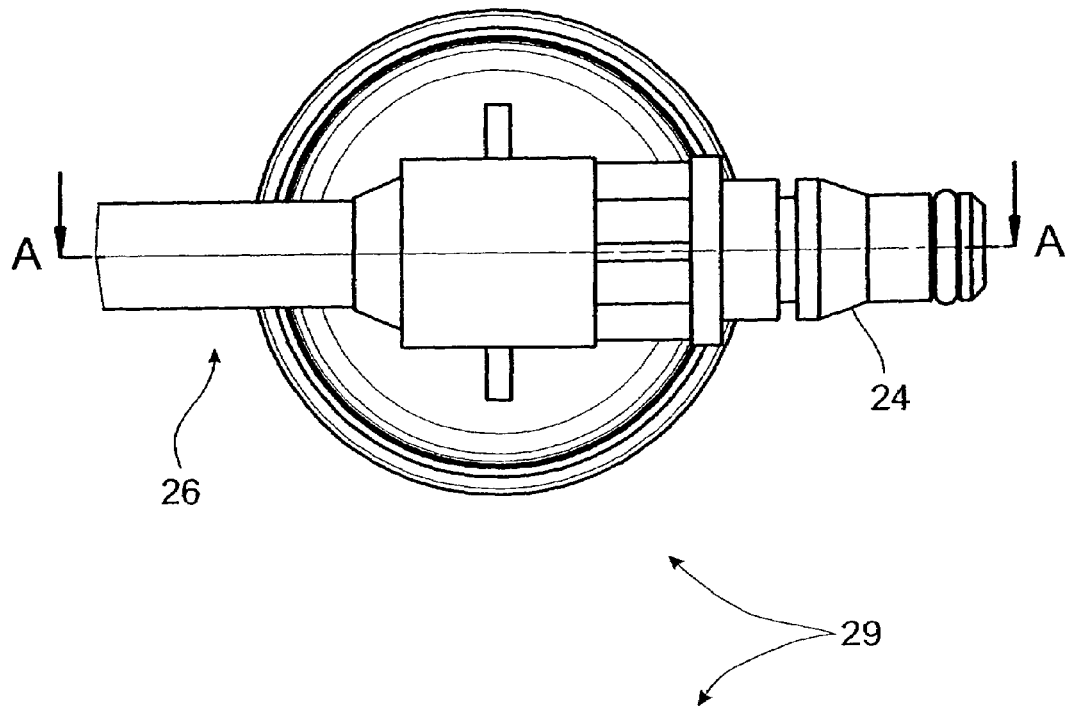
FIG. 2A is a plan view of a damping member formed integrally with a hydraulic line.
Figure 2B:
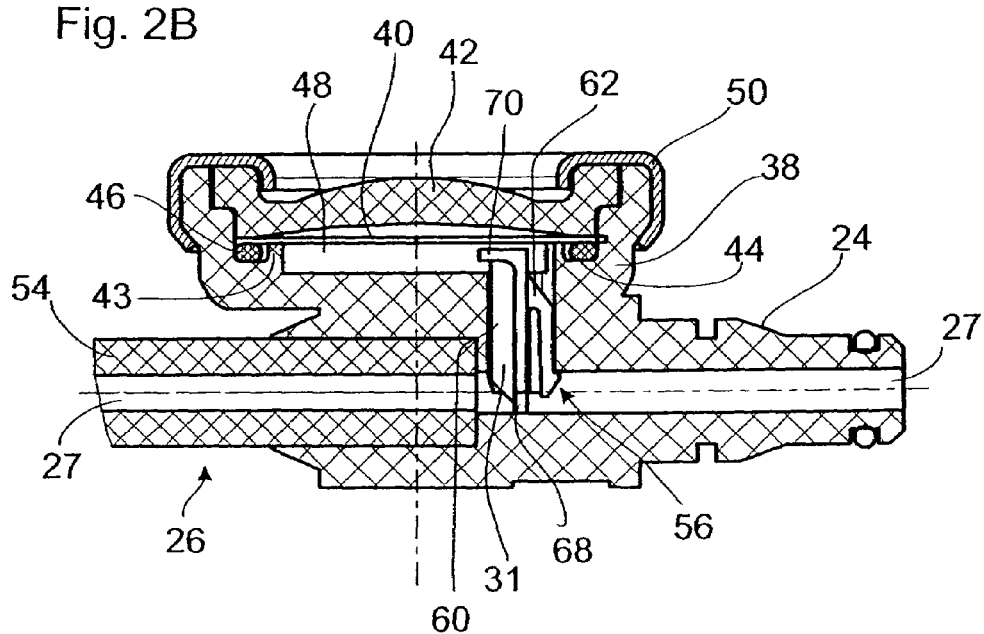
FIG. 2B is a cross-section along line A—A of FIG. 2A.

FIGS. 2A and 2B show a damping member 29 that is constructed as a diaphragm oscillator and comprises a cylindrical housing 38 with a circular steel-plate diaphragm 40 which is arranged therein at the face and which can oscillate during pressure pulsations of the hydraulic fluid. When there is a sudden increase in pressure, the diaphragm can deflect outward briefly and so provide additional volume so that a pressure pulsation can be reduced. The diaphragm 40 is pressed against an annular web 43 by a housing cover 42 and seals off a fluid pressure chamber 48 from the atmosphere by an O-ring seal 46 located in a groove 44. The cover 42 is held on its seat by a bead 50. The inner surface 52 of the cover 42 is concave so that, when a maximum permissible fluid pressure is reached, the diaphragm 40 can adapt to this so as to prevent overstretching of the diaphragm 40 and a possible bursting of the damping member 29.

In order to produce a fluid connection between the hydraulic line 26 and the damping member 29, a free end of a hydraulic line 26, which is preferably made of PA 12 plastic, is provided with a housing 38 that is injection-molded at this end and accordingly connected therewith so as to be tight against fluid. The housing 38 likewise comprises PA 12, but is additionally structurally reinforced by a fiber material, preferably glass fiber. It is important that a suitable, injectable plastics combination is used for the hydraulic line 26 and the housing 38. The other end, not shown, of the hydraulic line 26 is provided with a first hydraulic coupling element 24 for connecting to the slave cylinder 20. The housing 38 of the damping member 29 is formed integral with a second coupling element 24 for connecting to the master cylinder 16. The combination of the housing 38 with the coupling element 24 proves advantageous in technical respects with regard to manufacture because these parts can preferably be based on the same material and can accordingly be produced in one work cycle.

As can be seen in FIG. 2B, the main fluid channel 27, starting from the left-hand side, initially extends within the hydraulic line 26 and then passes into the housing 38 so as to exit by way of the coupling connector 24. A connection channel 31 branches off from the main channel 27 within the housing 38 and has a fluid connection to the pressure chamber 48 and can introduce pressure pulsations into the latter. The connection channel 31 is arranged in such a way that it opens into the peripheral area of the pressure chamber 48 so that when the damping member 29 is installed vertically, i.e., when the main channel 27 is oriented vertically and the coupling element 24 is directed upward, air bubbles located in the damping member 29 can easily escape from the latter in this way and the actuation system 10 can be completely bled.

As an alternative to the embodiment example in FIG. 2a, the connection channel 27 can also open out inside the hydraulic line 26 laterally into its jacket area 54 or into the coupling element 24.

According to FIG. 2C, the damping member 29 can also be arranged in any predeterminable position at a hydraulic line 26 that has already been outfitted at both sides with coupling elements 24. For this purpose, the jacket 54 of the hydraulic line 26 is provided at this position with an opening 55 and the housing 38 of the damping member 29 is injection molded on the hydraulic line 29, wherein the fluid connection, i.e., the connection channel 31 to the pressure chamber 48, is produced by the jacket opening. In this construction, therefore, the hydraulic line 26 is formed continuously in the area of the damping member 29.

A damping member 29 integrated in a hydraulic line 26 can also be realized by producing a hydraulic line 26 and a separate damping member 29 in a first step and connecting the two parts 26, 29 with one another in a fluid-tight manner in a second step in that the seal locations can be produced, for example, by injecting plastic or by vulcanizing a rubber material or similar sealing substance.

The function of the damping member 29 can be considerably improved by a fluid guide element 56 arranged at least in the area where the connection channel 31 is connected to the main channel 27, wherein this fluid guide element 56 influences the flow in the main fluid channel 27 and generates a fluid flow which is directed substantially to the damping member 29. The fluid guide element 56 which is shown at the damping member 29 in FIG. 2B extends chiefly inside the connection channel 31 and continues on both sides into the main channel 27 and into the pressure chamber 48.

Figure 3:
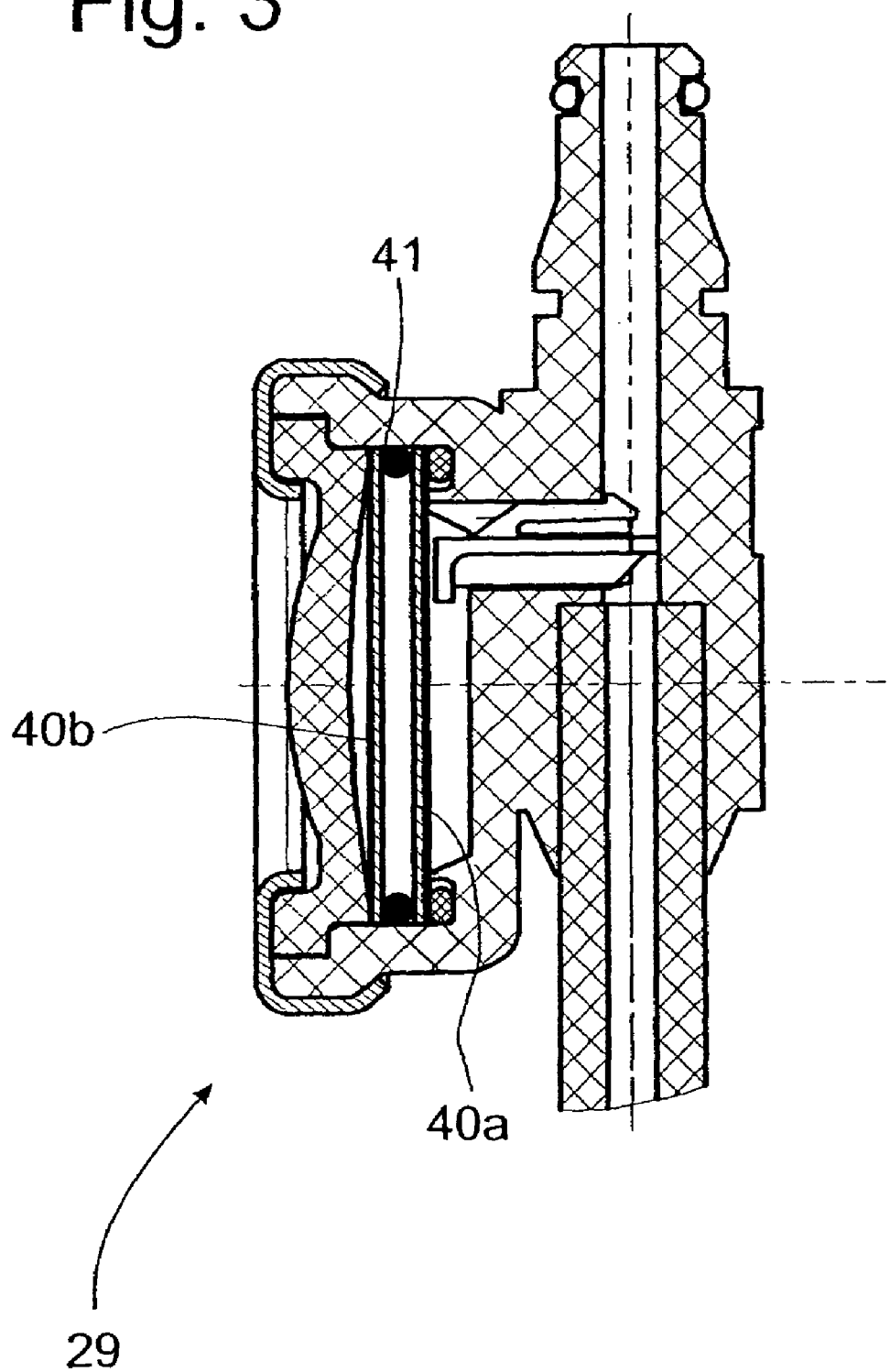
FIG. 3 shows a damping member with two diaphragms arranged parallel to one another.
Figure 4:
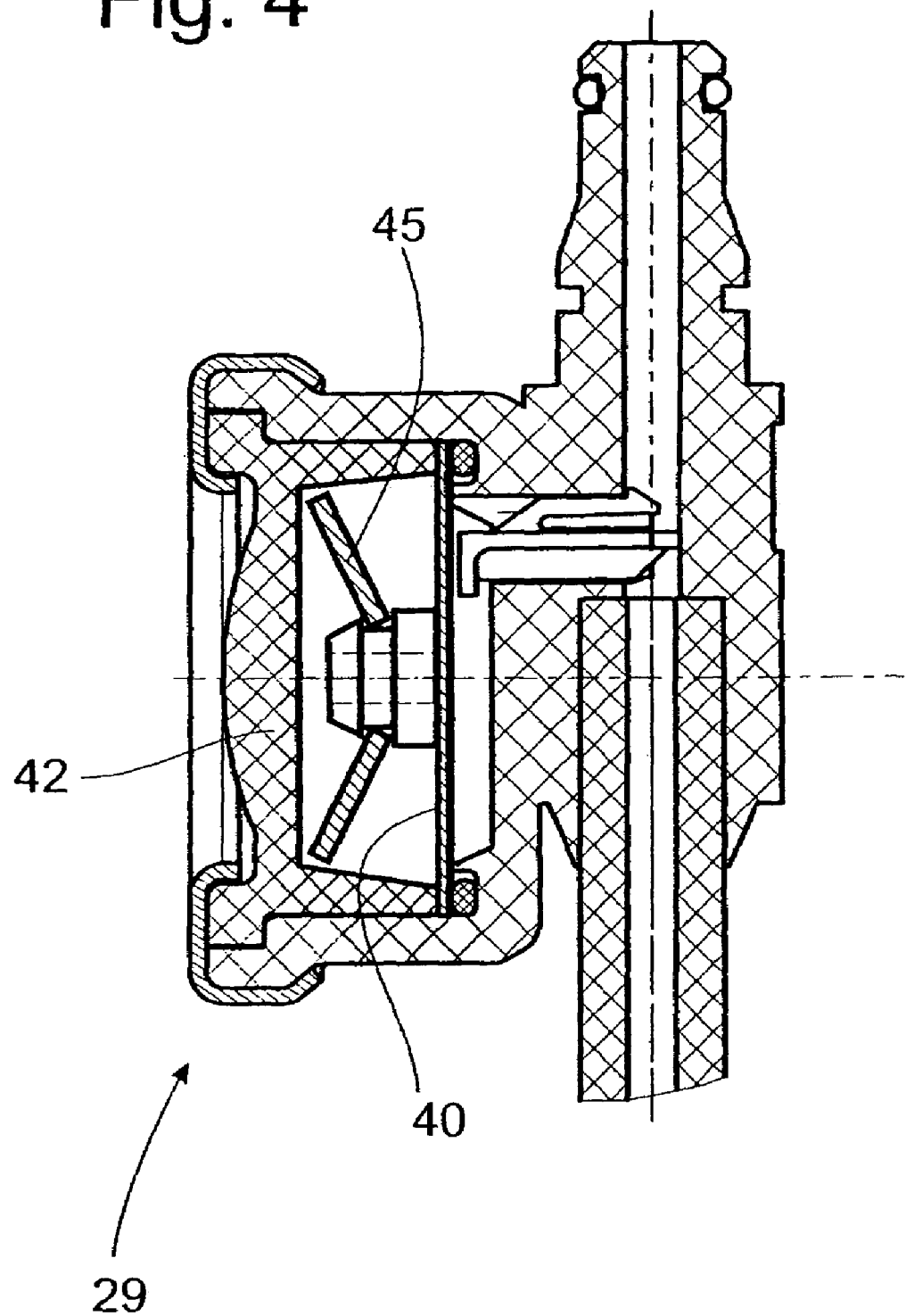
FIG. 4 shows a damping member in which the diaphragm is supported by a disk spring.

According to FIG. 3, two or more diaphragms 40a, 40b with identical or different stiffness which are spaced apart by spacers 41 can also be placed in the pressure chamber 48 instead of only one diaphragm 40 in order to adapt the damping behavior specifically to different drivetrain configurations and/or pressure ranges in an optimal manner. Further, as is shown in FIG. 4, a spring device, e.g., in the form of a disk spring 45, can also be arranged on the side remote of the pressure chamber 48, i.e., between the diaphragm 40 and the cover 42, to generate a counterforce depending on the extent of pressure pulsations and/or to limit the deflection of the diaphragm oscillator 29. The disk spring 45 is snapped onto a connection element 47 arranged at the diaphragm 40 and has intervening space for play with respect to the latter and/or with respect to the cover 42 to accommodate a deformation of the disk spring 45.

Figure 5B:
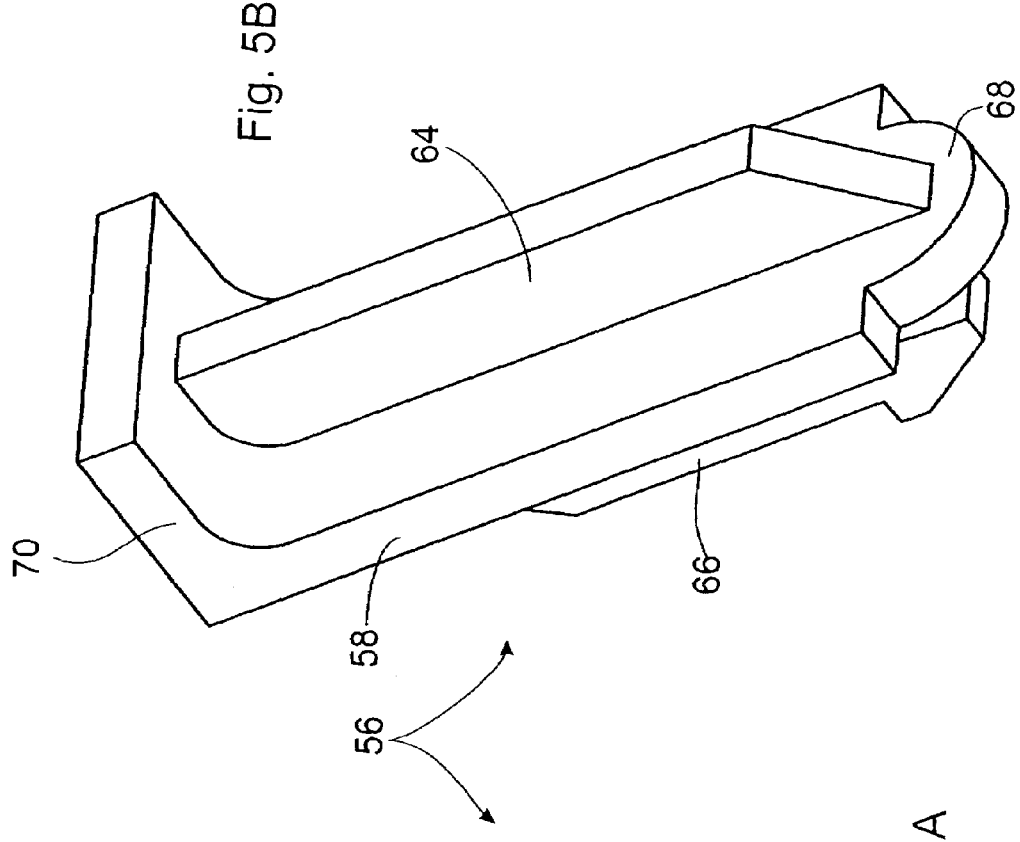
FIGS. 5A and 5B are enlarged perspective views of a fluid guide element arranged at the damping member of FIG. 2B.
Figure 5A:
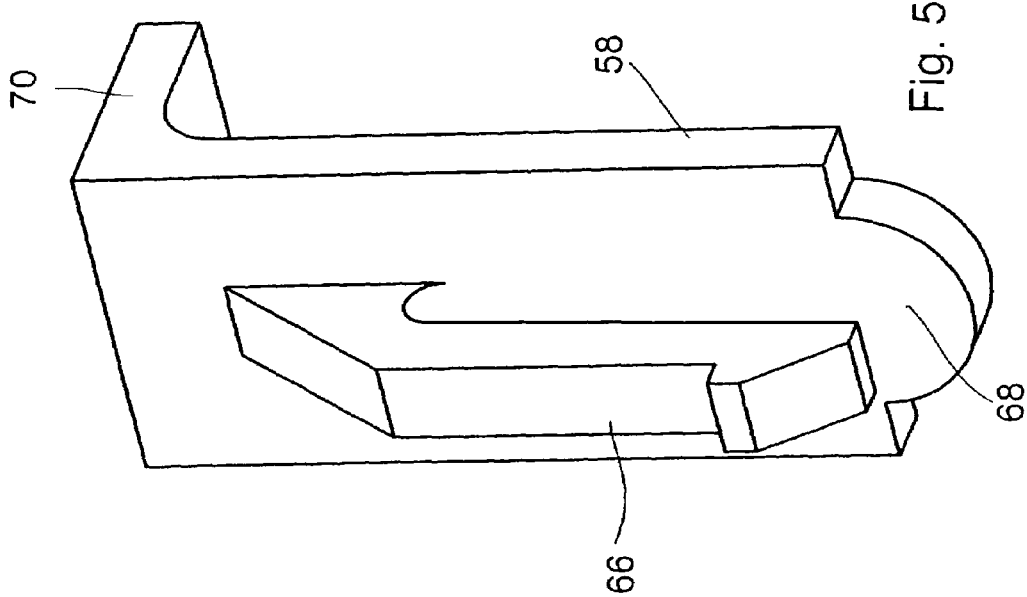

FIGS. 5A and 5B show a separate fluid guide element 56 which is manufactured as a plastic injection molded article and is based on an L-shaped dividing wall 58 which divides the connection channel 31 into an inlet channel 60 and an outlet channel 62 depending on the direction of flow. Two webs 64, 66 project from the two sides of the dividing wall 58 and serve as spacers for fixing the fluid guide element 56. One of the webs 64, 66 is constructed as a resilient catch hook 66 to produce a snap connection with the connection channel 31 and main channel 27. An end portion 68 of the dividing wall 58 projecting into the main channel 27 is formed as a semicircular disk and contacts the inner wall of the main channel 27 so that the otherwise continuous and direct main fluid channel 27 between the master cylinder 16 and the slave cylinder 20 is substantially interrupted in this area. The dividing wall 58 projects partially into the pressure chamber 48 and has, as its upper termination, a bend 70 which is oriented approximately parallel to the diaphragm 40 and by means of which the fluid flowing in is guided preferably laterally into the pressure chamber 48 so as to be swirled. In order to increase the dwell period of the fluid in the pressure chamber 48, the fluid guide element 56 can have additional dividing wall arrangements or guide arrangements, e.g., a web, or the like, which projects perpendicularly from the spacer 64.

The described fluid guide element 56 deflects the fluid flow entering, e.g., from the slave cylinder 20 into the main channel 27 so as to generate a fluid flow directed into the damping member 29. This flow is kept away from a flow exiting the damping member 29 in the direction of the master cylinder 16 by the dividing wall 58 that is arranged in the connection channel 31 and is finally forced by the area arranged in the pressure chamber 48 onto a flow path whose length is greater by a multiple than the mutual distance of the inlet channel 60 and outlet channel 62 so as to exit the pressure chamber 48 again via the outlet channel 62.

Alternatively, the above-described guiding and dividing means influencing the flow can also be carried out individually, i.e., separately, at the hydraulic line, the connection channel and the pressure chamber.

Finally, it should be mentioned that the damping member 29, shown by way of example in FIGS. 2A–2C can be formed with two or more pressure chambers 48, each of which is arranged with a connection channel 31 at the main channel 27. The individual pressure chambers 48 can be arranged in parallel in the main channel, which means that a propagating pressure pulsation impinges on all of the pressure chambers 48 without preference and simultaneously. On the other hand, it is also conceivable to arrange the pressure chambers 48 in series which can be realized, for example, by connection channels 31 that are arranged at the main channel so as to be offset in the direction of flow. In this case, a pressure pulsation passes through the individual pressure chambers 48 successively and becomes increasingly weaker along its flow path.

FIGS. 6A and 6B show a hydraulic line 26 having, at one end, a damping member 29 according to FIGS. 2A, 3 or 4 whose housing 38 is constructed jointly with a fluid coupling element 24a constructed as a plug-in connector. The fluid coupling element 24b formed at the other end of the hydraulic line 26 as a receiving part has a housing in common with an air-bleed element 29b and a throttle member 29c. In order to compensate for variations in spacing between the master cylinder 16 arranged at the chassis and the slave cylinder 20 mounted at the drivetrain that occur as a result of vehicle vibrations in running combustion engines, the hydraulic line 26, which is made of plastic, is provided with an expansion loop 71. This improves its elasticity appreciably. The letters A-L designate points of contraflexure along the course of the line or fitting dimensions for adapting to specific installation conditions depending on the type of vehicle.

FIGS. 7A and 7B show a detail of the fluid coupling element 24b shown in FIG. 6 with a throttle member 29c arranged inside the main fluid channel 27. Adjacent to the end portion of the jacket area 54, the fluid coupling element 24b has a recess 72 with a stepped down diameter relative to the latter. A stop ring 74 for a valve body 78 that is axially displaceable in a movement space 76 is arranged in this recess 72. The transition to a continuing center portion 79 of the main channel 27 is carried out with a step 80 of another stepped down diameter which forms another stop for the valve body 78. Depending on the direction of flow, the valve body 78 can move against the stop ring 74 at one time and against the step 80 at another time. The valve body 78 has a central, funnel-shaped bore hole 82 and, at the circumference, at least one through-channel 84 through which the fluid can flow.

A connection channel 86 opens laterally into the central portion 79 and produces a fluid connection to the air-bleed element 29 which is screwed into a housing portion 88 of the fluid coupling element 24b with a multiple-stepped internal bore hole, this housing portion 88 projecting laterally from the main body.

In other respects, the construction and design of the air-bleed element 29b and throttle member 29c correspond to the elements known from the prior art so that detailed descriptions are not necessary.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hydraulic actuation apparatus for a motor vehicle clutch, the apparatus comprising:
    a master cylinder;
    a slave cylinder;
    a hydraulic line connecting the master cylinder to the slave cylinder and together with the cylinders forming a pressure space; and
    a damping member arranged in the pressure space for attenuating pressure pulses, the damping member being assembled to the hydraulic line by a non-releasable connection and forming a single permanently integral piece together with the hydraulic line such that the master cylinder is connected to the slave cylinder by the hydraulic line and the damping member using only two coupling areas to complete the connection.

2. The apparatus of claim 1 wherein the damping member comprises a housing which is assembled to the hydraulic line by injecting plastic or by vulcanizing a rubber material.

3. The apparatus of claim 1 wherein the hydraulic line is made of plastic.

4. The apparatus of claim 1 wherein the damping member comprises a housing and a hydraulic coupling element which are molded as one piece of fiber reinforced plastic.

5. The apparatus of claim 1 wherein the damping member comprises a housing and a hydraulic coupling formed as one piece, the housing being fitted on an end of the hydraulic line.

6. The apparatus of claim 1 wherein the hydraulic line passes continuously through the damping member, the hydraulic line comprising a jacket having an opening inside the damping member.

7. The apparatus of claim 1 wherein a main fluid channel extends from said master cylinder to said slave cylinder, said main fluid channel being formed at least in part by said hydraulic line, the damping member comprising a pressure chamber and a connection channel connecting the main fluid channel to the pressure chamber.

8. The apparatus of claim 7 further comprising a baffle extending from the connection channel into the main fluid channel.

9. A hydraulic actuation apparatus for a motor vehicle clutch, the apparatus comprising:
    a master cylinder;
    a slave cylinder;
    a hydraulic line connecting the master cylinder to the slave cylinder and together with the cylinders forming a pressure space; and
    a damping member arranged in the pressure space for attenuating pressure pulses, the damping member being constructed integrally with the hydraulic line and comprising a plastic housing which is injection molded on the hydraulic line such that the master cylinder is connected to the slave cylinder by the hydraulic line and the damping member using only two coupling areas to complete the connection.

10. A hydraulic actuation apparatus for a motor vehicle clutch, the apparatus comprising:
- a master cylinder;
- a slave cylinder;
- a main fluid channel connecting the master cylinder to the slave cylinder and together with said cylinders forming a pressure space; and
- a damping member arranged in said pressure space for attenuating pressure pulses, said damping member comprising a connection channel connected to the main fluid channel and a fluid guide directing fluid from the main fluid channel into the connection channel,
- wherein the fluid guide comprises a baffle extending from the connection channel into the main fluid channel.

11. The apparatus of claim 10 wherein the master cylinder is connected to the slave cylinder by the main fluid channel and the damping member using only two coupling areas to complete the connection.

12. The apparatus of claim 11 wherein the baffle divides the connection channel into an inlet channel and an outlet channel.

13. The apparatus of claim 12 wherein the damping member comprises a pressure chamber, said fluid guide comprising a lateral wall which deflects fluid flow laterally from said inlet channel into said pressure chamber.

14. The apparatus of claim 13 wherein fluid guide is a one piece fluid guide element comprising the baffle and the lateral wall.

15. The apparatus of claim 13 wherein the connection channel opens into a peripheral area of the fluid chamber.

16. The apparatus of claim of claim 10 wherein the main fluid channel is formed at least in part by a hydraulic line, the damping member being constructed integrally with the hydraulic line.

17. A connection piece for hydraulically connecting a master cylinder and a slave cylinder, the connection piece including a hydraulic line and at least one additional hydraulic operating component assembled to the hydraulic line by a non-releasable connection and forming a single permanently integral combination piece together with the hydraulic line such that the connection piece is configured to connect the master cylinder to the slave cylinder by the hydraulic line and the hydraulic operating component using only two coupling areas to complete the connection.

18. The connection piece of claim 17 wherein the additional operating component comprises a fluid coupling element for connection to said master cylinder or said slave cylinder.

19. The connection piece of claim 17 wherein the additional operating component is made of plastic.

20. The connection piece of claim 17 wherein the additional hydraulic operating component is comprises at least one of a damping member for attenuating pressure pulses, an air bleed element for removing air from the hydraulic line, and a throttle member for limiting the flow rate of a hydraulic fluid.

21. The connection piece of claim 17 wherein the operating component comprises a plastic housing which is injection molded on the hydraulic line.

22. The connection piece of claim 17 wherein the operating component comprises a housing which is assembled to the hydraulic line by injecting plastic or by vulcanizing a rubber material.

23. The connection piece of claim 17 wherein the hydraulic line is made of plastic.

* * * * *